United States Patent [19]

Cotton

[11] Patent Number: 4,507,748
[45] Date of Patent: Mar. 26, 1985

[54] ASSOCIATIVE PROCESSOR WITH VARIABLE LENGTH FAST MULTIPLY CAPABILITY

[75] Inventor: John M. Cotton, East Norwalk, Conn.

[73] Assignee: International Telephone and Telegraph Corporation, New York, N.Y.

[21] Appl. No.: 404,242

[22] Filed: Aug. 2, 1982

[51] Int. Cl.³ .......................... G06F 7/38; G06F 7/52
[52] U.S. Cl. ................................ 364/749; 364/200; 364/757
[58] Field of Search ............... 364/749, 754, 757, 758, 364/759, 200 MS File, 900 MS File, 748

[56] References Cited

U.S. PATENT DOCUMENTS

| | | | |
|---|---|---|---|
| 4,068,305 | 1/1978 | Cutler | 364/200 |
| 4,099,233 | 7/1978 | Barbagelata et al. | 364/200 |
| 4,287,566 | 9/1981 | Culler | 364/754 |
| 4,310,879 | 1/1982 | Pandeya | 364/200 |

OTHER PUBLICATIONS

Clayton L. Hallmark, *The Master IC Cookbook*, pp. 390-391, printed 1980.

*Primary Examiner*—Raulfe B. Zache
*Assistant Examiner*—Dale M. Shaw
*Attorney, Agent, or Firm*—John T. O'Halloran; Jeffrey P. Morris

[57] ABSTRACT

An associative processor is described wherein an array of associative processing cells is configured to achieve variable length multiplication of numbers, such as binary two's complement numbers, under mask control. A configuration suitable for signal multiplication is described wherein the processing sequences in all cells are compatable, each to the other, whether the cells are at the edges or the middle of an array row, and regardless of the computational sequences required to be performed. An associative cell structure is described, including an improved arithmetic logic unit having separate carry and borrow save paths which may be enabled and active simultaneously or alternately.

21 Claims, 11 Drawing Figures

= DELAY FLIP FLOP

= AND GATE

R = RESULT  B = BORROW  C = CARRY
R' = RESULT FROM PREVIOUS STAGE AND PREVIOUS SHIFT TIME
B' = BORROW FROM PREVIOUS SHIFT TIME
C' = CARRY FROM PREVIOUS SHIFT TIME

ASSOCIATIVE PROCESSOR WITH VARIABLE LENGTH FAST MULTIPLY CAPABILITY

BACKGROUND OF THE INVENTION

1. Field of the Invention

The present invention relates generally to associative processing and more specifically to an associative processing array structure having a fast multiplication with variable numeral length under mask control. The associative processing array of the present invention is particularly advantageously utilized in an LSI (large scale integrated circuit) or VLSI (very large scale integrated circuit) configuration, in that a reduced amount of circuitry and pin connections are achieved by the unique circuitry disclosed.

Associative processors having the aforementioned fast multiplication with variable numeral length capability under mask control are useful not only in associative processing computers, but also are useful generally in systems requiring a fast computation capability. Such systems include, by way of example, engineering workstations, data base management systems, topological analysis, graphics display, speech recognition, image enhancement, radar applications such as phased arrays, synthetic apertures, echo and wake analysis and tracking, text management systems and telecommunications, including digital filtering applications.

2. Description of the Prior Art

Associative processors may be considered as arrays of single path processors wherein each single cell only accesses its neighbor cells. Associative processors may be accessed by mutual parallel data streams, the memory thereof is addressable by content and the data structure is based on tags.

While a conventional processor operates on one data item at a time sequentially, an associative processor operates on many data objects simultaneously. For this to be useful the data objects must be of the same type for any individual instruction so that it is meaningful to apply the same sequential instruction stream to operate simultaneously on these data objects. This class of processor is known as a S ingle I nstruction M ultiple D ata processor (SIMD).

The associative processor may consist of a rectangular array of single bit computers implemented in LSI, each capable for example of having from 2K to 64K bits of memory. These cellular computers obey the same instruction simultaneously, each operating on its own data. The cells can intercommunicate in all four directions with their neighbors and also with external data input and output registers.

The cells in a row of the associative processor array can be dynamically (from one instruction to the next) configured into an arbitrary number of fields of arbitrary defined length (within the constraints of the width of the array). Each field can then operate independently as if it were a separate computer of the given word length, able to perform arithmetic and logical operation. These fields can all obey the same instruction simultaneously, or they may be selectively disabled under program control.

The net effect is that of a set of computers of arbitrary defined word length, which when they are enabled, obey the same arithmetic or logic operation simultaneously on different data items. This set of computers can be applied to problems requiring matrix arithmetic, algebra, vector calculations, image (pixel) processing, and searching and pattern recognition problems, and speech recognition. They can perform both fixed point and floating point arithmetic to any required accuracy. The thruput of this set of processors is dependent on the size of the array, the length and number of fields and the proportion of the array which is enabled for a particular operation. For example, a 128 × 128 cell array operating on 2048 eight bit numbers simultaneously using a 10 MHz clock is estimated to achieve on the order of 4,000 million additions or logical operations per second and on the order of 1,000 million multiplications per second.

Associative memories, sometimes referred to as Content Addressable Memories, are well known generally, and are organized to function in an associative processor, wherein arithmetic operation may be performed on one or more digital words stored in the memory simultaneously. Such associative processors are described in U.S. Pat. No. 4,068,305. As illustrated by U.S. Pat. No. 4,296,475, such content-addressable memories are word-organized, and efforts have been made to reduce the number of connection pins required for employing the memory. Association between certain bits of an instruction word and previously assigned flags (from status flip-flops, for example) is known such that a data processor executes instructions conditionally by providing masking bits in the instruction word to override one or more association bits. The foregoing is described by U.S. Pat. No. 4,010,452. U.S. Pat. No. 4,044,338 describes an associative memory having separately associable zones. Seletive coupling of circuit elements to a data bus wherein each circuit element has an associative address is described by U.S. Pat. No. 4,188,670. U.S. Pat. No. 4,159,538 is illustrative of an LSI associative memory wherein the number of pin connections is reduced by sharing certain package pins by input data, output data and mask information. A serially accessed associative memory is described by U.S. Pat. No. 4,153,943.

SUMMARY OF THE INVENTION

An associative processor is described wherein an array of associative processing cells is configured to achieve variable length fast multiplication of numbers, such as binary two's complement numbers, under mask control. A configuration suitable for signed multiplication is described wherein the processing sequences in all cells are compatable, each to the other, whether the cells are at the edges or the middle of an array row, and regardless of the computational sequences required to be performed. An associative cell structure is described, including an improved arithmetic logic unit having separate carry and borrow save paths which may be enabled and active simultaneously or alternately.

DESCRIPTION OF THE PREFERRED EMBODIMENT

Figure 1:
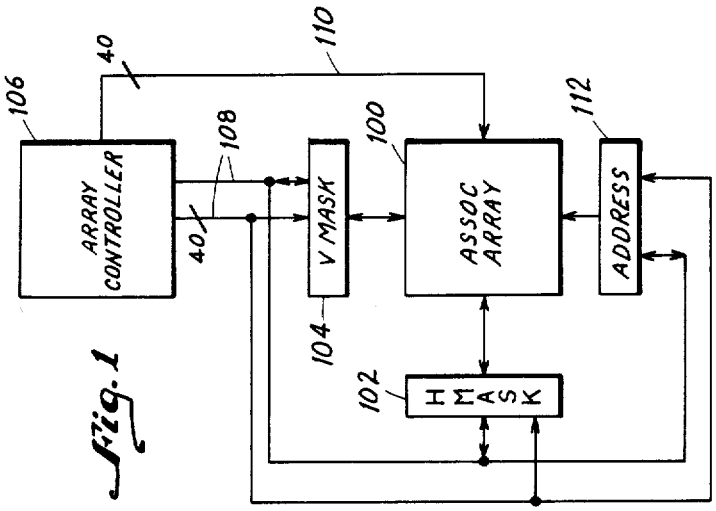
FIG. 1 is a simplified block diagram of an associative processor illustrating generally the control external thereto.

Referring to FIG. 1, a simplified block diagram is illustrated of an associative array 100 together with its horizontal and vertical mask registers 102 and 104 respectively. The mask registers 102 and 104 selectively enable or disable parts of the array 100, thereby effectively defining which area of the array 100 will operate for a particular instruction from the array controller 106. The array controller 106 may be comprised of any known microprogrammed controller with programmed and/or programmable memory for storing applications programs and interpreting them as a sequence of array operations which are coupled to masks 102 and 104 via mask instruction lines 108 and the array 100 via array instruction lines 110. Typically, there may be 40 such lines 108 and 40 such lines 110 in an array. The instructions on lines 108 perform microprogram control for masks 102 and 104 and couple array addresses to address register 112. The address is the address for memory supplied per cell of the array, which is described subsequently at 212 of FIG. 3. The instructions on line 110 perform microprogram control for the array 100. The combinational effect of the instructions on lines 108 and 110 may be used to cause the array and its masks to effect a search of a file for those records having a particular characteristic, and then multiplying a portion of that record by some factor.

Figure 2:
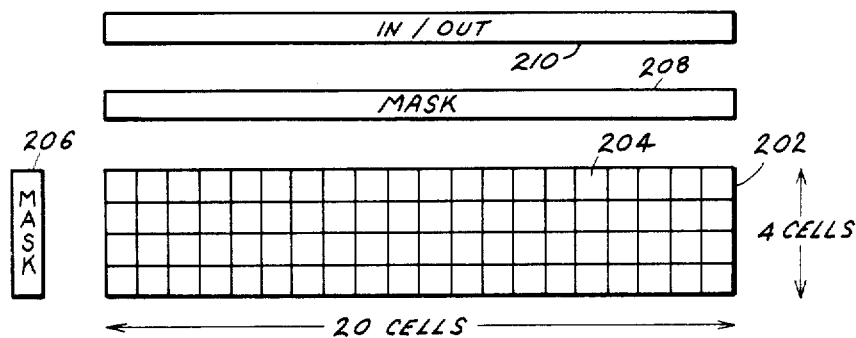
FIG. 2 is a simplified drawing of a 20 cell by 4 cell associative array with vertical and horizontal masks.

An associative array, which may be considered to be a subset of an associative processor, is illustrated generally at FIG. 2. Illustratively, the array comprises a matrix 202 of 20 cells by 4 cells, one of which cells is designated at 204. The associative array includes a horizontal mask register 206 of 4-bits, a vertical mask register 208 of 20-bits and a vertical IN/OUT register 210 of 20-bits.

Figure 3:
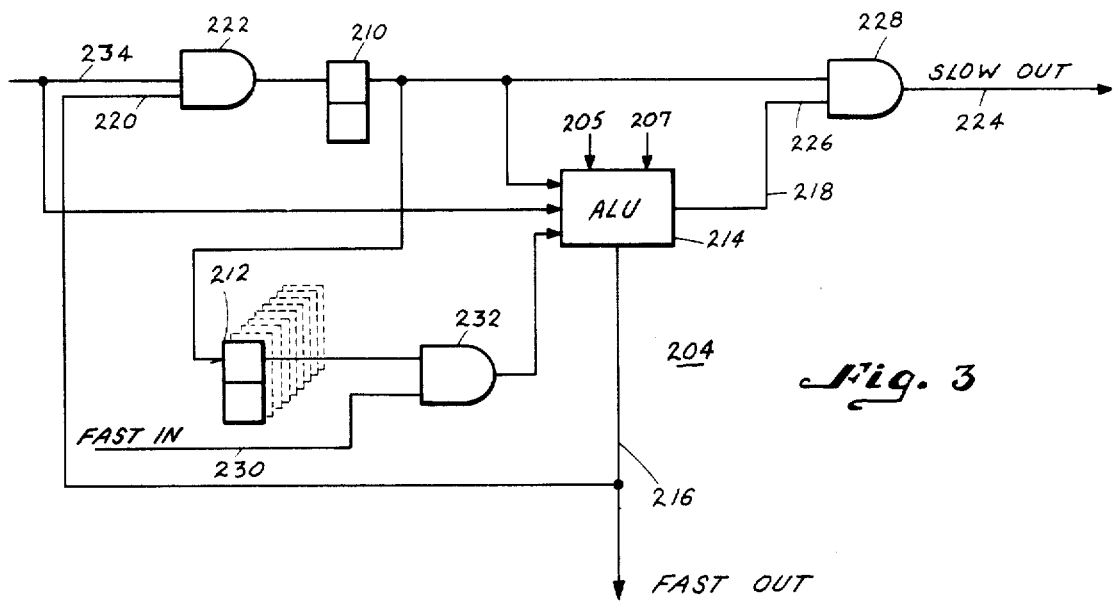
FIG. 3 is a logic diagram of a simple cell.

Referring to FIG. 3, a single associative cell such as cell 204 is illustrated in an arrangement in accordance with a feature of existing associative processors. Cell 204, which is identical to all other cells in array 202, includes one A flip-flop 210 and eight M flip-flops, shown collectively at 212, together with the associated control logic. The eight M-flip-flops represent memory which may be randomly accessed and flip-flop 212 acts as the memory data register bit. The number eight is illustrative only and could be any number such as 8,000 or 64,000. An arithmetic logic unit (ALU) 214 is utilized as is well-known to provide arithmetic operations, and may be of conventional design. Also, as is well-known in data processing, when ALU 214 is used as an adder, it has a sum output on line 216 and a carry output of line 218. When ALU 214 is performing addition, the sum bit on line 216 is fed back to the A flip-flop 210 at input gate 220 of selector switch 222. When performing addition, the carry bit is coupled to "slow-out" line 224 via gate 226 of selector switch 228. The fast in line 230 is a connection from the data register 210 to selector gate 232 to allow operands, for example, for search purposes, to be fed into the ALU 214 portion of the cell. The fast out line is a connection to pass the ALU result to the I/O register 210 of FIG. 2. The slow out line is the carry or shift bit to the next cell. Data from a neighboring cell, either a carry input or data being shifted is coupled in on line 234. The vertical and horizontal mask registers 206 and 208 respectively are comprised of associative cells similar to cell 204, and one connected to connections 205 and 207 on FIG. 3.

Figure 5:
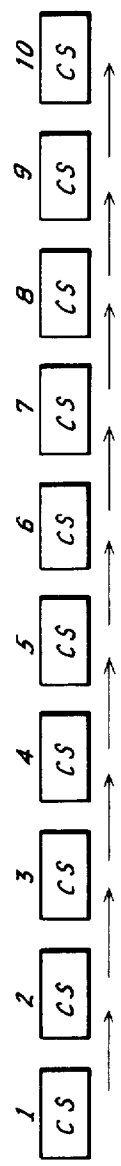
FIG. 5 is a simplified representation of ten multiply cells in a row.
Figure 4:
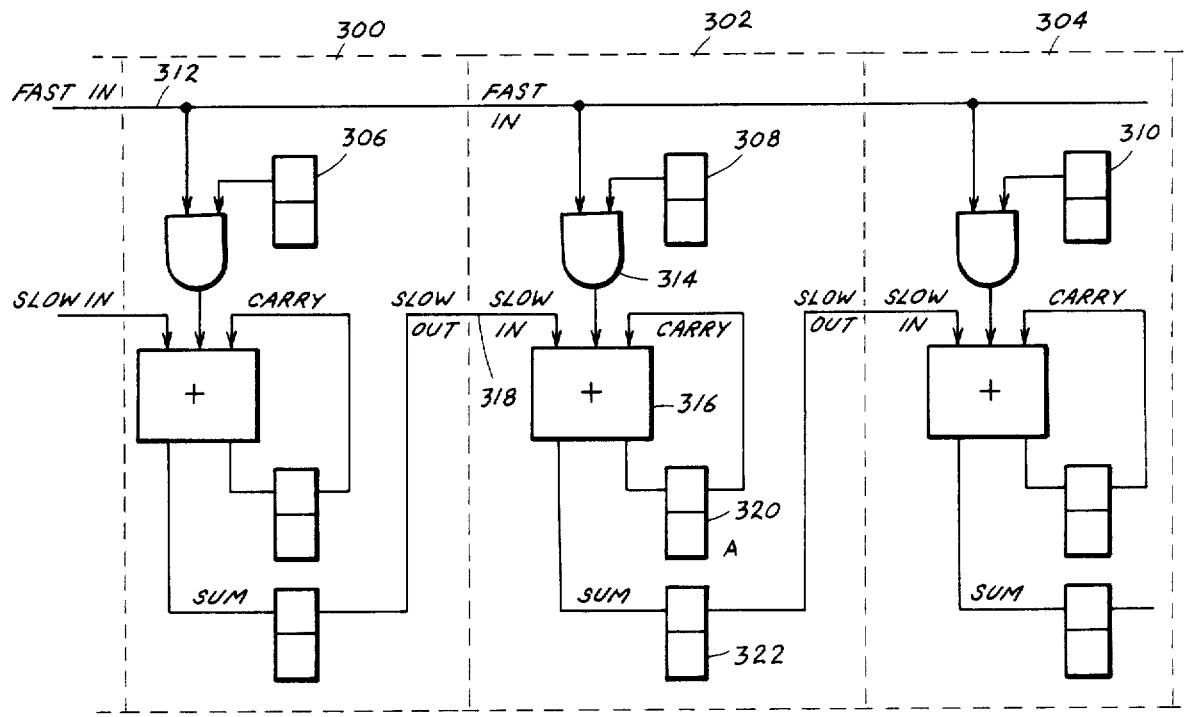
FIG. 4 is a logic diagram of a serial-parallel multiplication arrangement.
Figure 6:
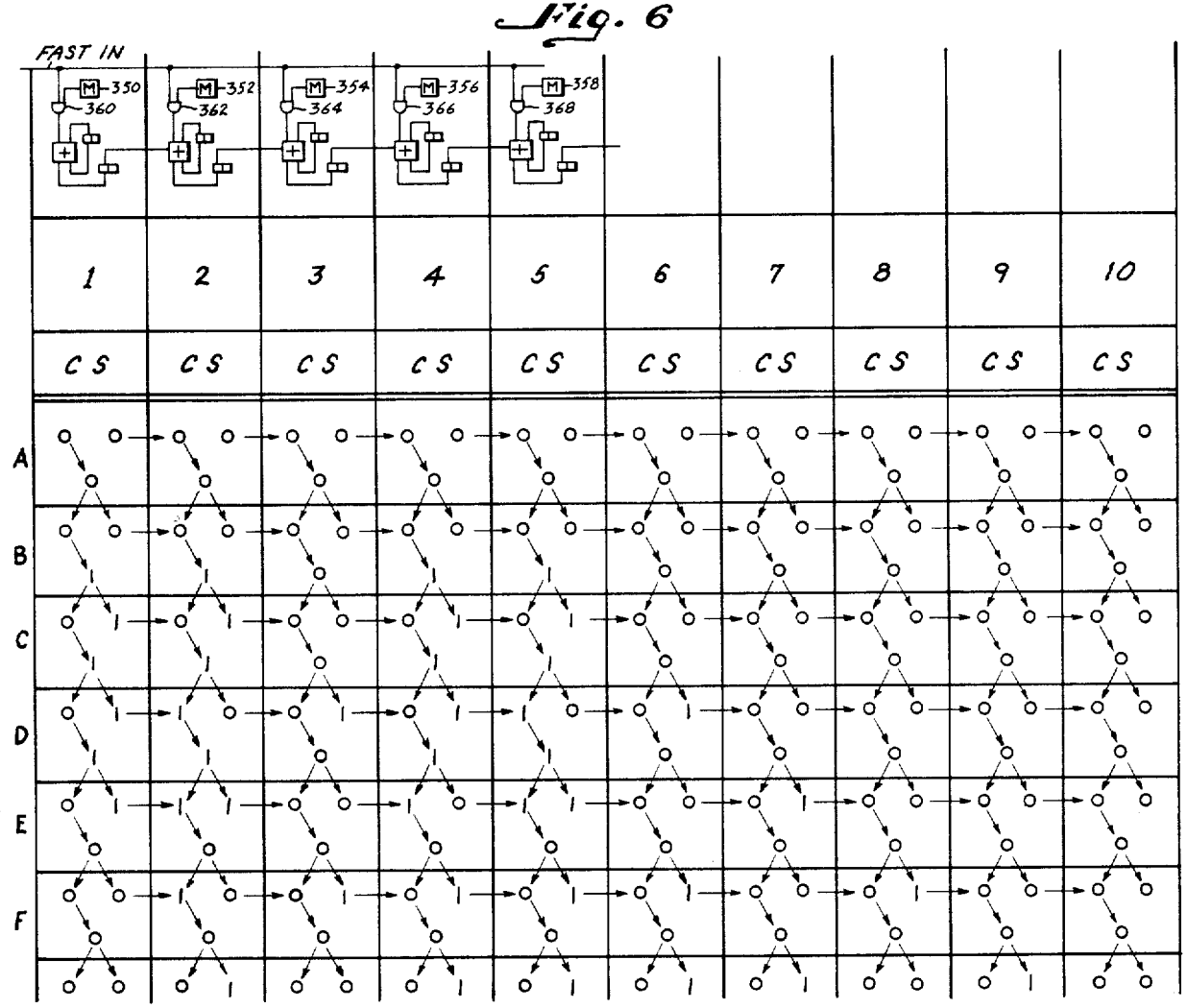
FIG. 6 illustrates the data flow for serial-parallel multiplication.

FIGS. 4, 5 and 6 illustrate the operation of a serial-parallel multiplier which consists of a number of identical units as shown illustratively as 300, 302 and 304 in FIG. 4 Flip flops 306, 308 and 310 carry the multiplicand. The multiplier is fed into the fast in line 312 1-bit at a time. FIG. 4 illustrates a portion (3-units) of, for example, a five bit multiplier, which would require 10 units as shown in FIG. 5.

The operation of the multiplier unit 302 is as follows: the multiplier value is fed into the fast in line 312 and AND'ed at gate 314 with the resident bit of the multiplicand and the result is used as one input to the adder 316. The second input to the adder on line 318 comes from the slow output of the previous unit which carries the result of the multiplication operation with the previous bit of the multiplication operation in cell 300 from the multiplier on line 312. The third input to adder 316 consists of the carry bit stored in flip-flop 320 from the result of previous step of the multiplication. The sum and carry results of the addition performed with the present step of the multiplication are stored in flip-flops 322 and 320 respectively. Cells 300 and 304 are identical in operation to cell 302.

Referring now to FIG. 5, the serial-parallel multiplication operation will be described for an exemplarly multiplication operation wherein a five bit multiplicand is multiplied by a five bit multiplier. The product will be ten bits. Ten multiplier units as illustrated by FIG. 5 are capable of performing the aforementioned multiplication.

While a row of ten multiplication units 1 through 10 are illustrated, it is noted that only five such units are required to perform a five by five multiplication, such as units 1 through 5 of the row of units of FIG. 5. Units 6 through 10 could, alternatively, be replaced by a shift register. In serial arithmetic operations, the product bits could be utilized as fast as they are generated by unit 5.

Each of the units of FIG. 5 is capable of simultaneously storing a sum bit S and a carry bit C. When performing each step of the multiplication, each unit propagates its sum bit to the right. In each unit, the incoming sum bit is combined with the existing carry bit and the result of the logical and of the resident multiplicand bit and the incoming multiplier bit to derive a new sum bit and a new carry bit as described with reference to FIG. 4.

A binary number which is the result of a binary addition can be described as consisting of two rows, one row containing the sum bits and the other row containing the carry bits. Computations can be performed on such representations of binary numbers and the final absorption of the carries can be delayed until such time as it is necessary to produce the result in final form which consists of a single row of sum bits. This multiplication technique takes advantage of the hereinafter described two row representation of a binary addition until the end of multiplication when all carries are finally absorbed.

The following numerical example of a five by five multiplication is described with reference to FIG. 6.

MC=11011

MP=01110

The product will be 0101111010.

In FIG. 6, a row of multiplier units is illustrated wherein the vertical column represents ten multiplier units or, in the alternative, five multiplier units (units 1 through 5) and five stages of a shift register (units 6 through 10). The figure illustrates how an addition is performed by each unit or stage; however, it is to be understood that the addition feature is not required in units 6 through 10 for a five by five multiplication.

The multiplicand bits are held in the M flip-flops 350, 352, 354, 356 and 358 of units 1 through 5 respectively. These multiplicand bits are AND'ed with a multiplier bit at AND gates within each cell, shown as AND gates 360, 362, 364, 366 and 368. Thus, the multiplier bit functions as a mask for the multiplicand bits.

Row A shows the condition of all ten units before multiplication is initiated. The sum bits and the carry bits are zero in all cells in Row A. The first operation shown in Row A is to add the multiplicand to all units. Since the lowest order bit of the multiplier is zero, the effect in Row A is to add all zeros to the already empty units. This result appears in Row B, where it can be seen that in Row B all carry and sum bits are still zero.

In Row B, it is again desired to add the multiplicand to the contents of each of the units, and it can be seen when this operation is performed, the next to the lowest order bit of the multiplier is a "one". The multiplicand bits appear in the row indicated by the plus (+) sign. With reference to Row B column 1, it can be seen that a "one" is added to a "zero" to derive a sum bit of "one" and a carry bit of "zero" in Row C, column 1. Also in column 1 of Row B, a "zero" sum "S" bit is added to a "zero" carry "C" in Row B, column 2, together with an MC bit of "one" to produce a sum bit of "one" and a carry bit of "zero" in Row C, column 2. The arrows in the cells indicate the operation of the adder in each unit.

In Row D, the multiplier is again a "one" and the operation is the same as described with respect to Row C.

In Row E, it can be seen that all "zeros" are again added to each unit since the multiplier bit, for the examplary binary number is again a "zero". The processing time expended in adding all "zeros" in Row E is not wasted since in Row E, carry bits are propagated to the right, which is necessary in obtaining the final multiplication product. In the event that the product bits are used as fast as they are generated by unit number 5, the addition of "zeros" in Row E would be needed since it would not be known whether the product bit is a "one" or a "zero" until the addition of zeros is performed.

Row F is required for the final propagation of carry bits to the right. The foregoing is an example of unit operation in multiplying the binary number 11011 by 01110 to obtain the product 0101111010.

The serial-parallel multiplication described above with reference to FIGS. 5, 6 and 7 is the basis of the multiplication mechanism to be incorporated in the associative cell design for the associative processor of the present invention. In a serial-parallel multiplier designed for multiplication only, the wiring patterns, for shifting the multiplier value into the multiplier hardware and for taking the result and utilizing it elsewhere are predetermined for multiplier hardware of a specified size. The novel features of this invention relate to the provision of selectable paths for the multiplier and results of a multiplication of selectable operand length whose position within a row of associative cells is variable and may be determined by software or by accessing the contents of a memory.

Figure 7:
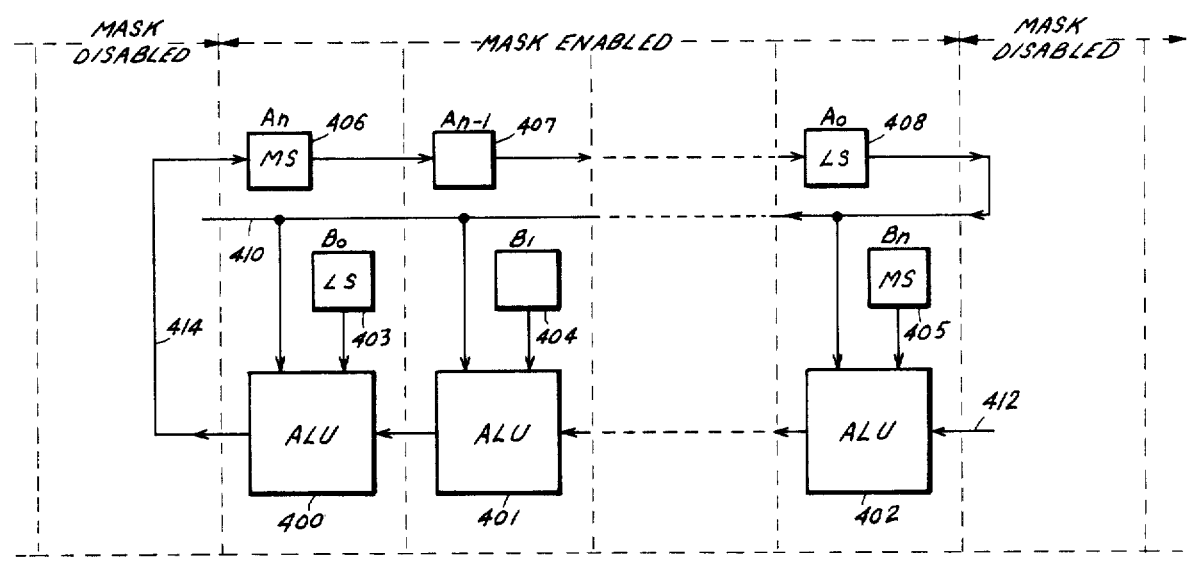
FIG. 7 is a block diagram of an arbitrary length multiplication configuration of associative cells.

Referring now to FIG. 7, a block diagram of an arbitrary or variable length multiplication is illustrated. Such a variable length multiplication using an associative cell arrangement is particularly advantageous in telecommunication line circuit applications, which can utilize the associative processor as recursive digital filters in the equalizer. Also, the associative processor can be utilizied in the hybrid filter, a transverse digital filter. Variable length multiplication using associative processing configured as an expandable array is also advantageous in applications other than in telecommunication, and is applicable to signal processing and database applications generally.

In order to achieve an expandable array, the multiplication operation must be of variable length and under mask control. Thus, each associative cell must, when enabled during a multiplication operation, accept one bit of the multiplier, one bit of the multiplicand, and accept two bits of the result. One result bit can be used to overwrite the multiplicand. Each associative cell must, when dissabled during a multilication operation, be connected to its neighboring cells so that if it is at the boundary of an active region, it will provide the necessary "loop-back" connection between inputs and outputs of the active cells to enable the serial multiplication to be performed.

FIG. 7 illustrates the arbitrary length multiplication operation of the present invention. The arrows indicate data flow. FIG. 7 illustrates the initial conditions for a multiplication operation for a multiplier A and a multiplicated B, both of which numbers are, illustratively, positive binary two's complement numbers. FIG. 7 also illustrates the multiplication during the first $n+1$ shift pulses applied to the cells. At the end of this period (of $n+1$ shift pulses where $n+1$ is, the number of bits in A.), multiplier A will have been replaced by the first $n+1$ (least significant) bits of the result R. The $n+1$ most significant bits are held in the delay binary registers and in the carry binary registers of the arithmetic units. Reference can be made to FIG. 4 for register and ALU configuration, for the case wherein simple flip-flops are employed. The most significant bits will be at the right.

The configuration of FIG. 7, which shows a row of associative cells, each having an arithmetic logic unit (ALU) 400, 401 . . . 402, registers for holding multiplicand numbers Bo, B1 . . . Bn, shown at 403, 404 and 405 with register 403 holding the least significant bit, and registers 406, 407 and 408 for holding multiplier numbers An, A(n−1), . . . Ao, with register 406 holding the most significant bit. Where the mask is enabled, the processing operation occurs in each cell. Where the mask is disabled, at the right hand end of the MASK ENABLED section, the output of register 408 is coupled to ALU's 400, 401 . . . 402 and a zero bit is entered on line 412 from the disabled cell. At the other end of the MASK ENABLED section, the MASK DIS- ABLED cell connects ALU 400 to flip-flop 406 via line 414.

The configuration of FIG. 7 cannot perform a signed multiplication. A signed multiplication is one in which a number is represented with the most significant bit (MSB) representing its sign. In two's complement arithmetic, the MSB is a zero, which represents a positive number, or a "1" to represent a negative number.

Assuming that it is desired to multiply two values, which are two's complement (signed) binary numbers P and Q, which are represented as follows:

$$P = -a_n 2^n + a_{(n-1)} 2^{(n-1)} + a_{(n-2)} 2^{n-2} \ldots$$
$$a_o 2^o = -a_n 2^n + A$$

$$Q = -b_n 2^n + b_{(n-1)} 2^{(n-1)} + b_{(n-2)} 2^{n-2} \ldots$$
$$b_o 2^o = -b_n 2^n + B$$

Thus, P multiplied by Q equals:

$$(-a_n 2^n) \times (-b_n 2^n) + (-a_n 2^n) \times B + (-b_n 2^n) \times A + A \times B.$$

Referring again to the multiplier arrangement of FIG. 7, the binary significance of B is by position and the binary significance of A is represented by the time at which the coefficient is shifted in, therefore:

$a_j 2^j$ is represented by $a_j T_j$, where $T_j$ is the j th shift pulse shifting data from flip-flop 408 onto line 410.

The following is an example of a space/time representation of a signed multiplication:

| | | |
|---|---|---|
| $b_o 2^o \ldots$ | $+ b_{(n-2)} 2^{(n-2)}$ | $+ b_{(n-1)} 2^{(n-1)} - b_n 2^n$ |
| $T_o$ | $a_o b_{(n-2)}$ | ← |
| $T_1$ | $+ a_o b_{(n-1)}$ | shift direction |
| | $+ a_1 b_{(n-2)}$ | $+ a_o t_o \ldots - a_n t_n$ |
| $T_2$ | $+ a_o (-bn)$ | (Assume zeros applied after Tn) |
| | $+ a_1 b_{(n-1)}$ | |
| | $+ a_2 b_{(n-2)}$ | |
| $T_{n-1}$ | $a_{(n-1)} b_{(n-2)}$ | |
| | $+ a_{(n-2)} b_{(n-1)}$ | |
| | $+ a_{(n-3)} \cdot (-bn)$ | |
| $T_n$ | $(-an) b_{(n-2)}$ | $= -an \cdot b_{(n-2)}$ |
| | $+ a_{(n-1)} \cdot b_{(n-1)}$ | $+ a_{(n-1)} \cdot b_{(n-1)}$ |
| | $+ a_{(n-2)} \cdot (-bn)$ | $+ 9(n-2) \cdot (-bn)$ |
| $T_{n+1}$ | $(-an) \cdot b_{(n-1)}$ | $= -an \cdot b_{(n-1)}$ |
| | $+ a_{(n-1)} \cdot (-bn)$ | $+ a_{(n-1)} \cdot (-bn)$ |
| $T_{n+2}$ | $(-an) \cdot (-bn) =$ | $= -an \cdot (-bn) = +an \cdot bn$ |

From the foregoing, it has been determined that the same circuit configuration as is applicable for unsigned numbers is operable for signed numbers provided that the arithmetic logic unit for the most significant bit of the number Q (which is represented by $b_n$) is set to subtract instead of add. Also when the most significant bit of P (which is represented by $a_n$) is being shifted in, the arithmetic units which were previously set to add must be set to subtract, and the arithmetic logic unit that was previously set to subtract must be set to add. It has also been determined that for proper operation for signed numbers, 2n shift pulses must be applied with "zeros" being shifted in instead of the coefficients of P. The results must either be shifted into a second set of binaries (registers) or the LS (least significant) results must be written out elsewhere after Tn shift pulses before the most significant half of the result is shifted in.

Figure 8:
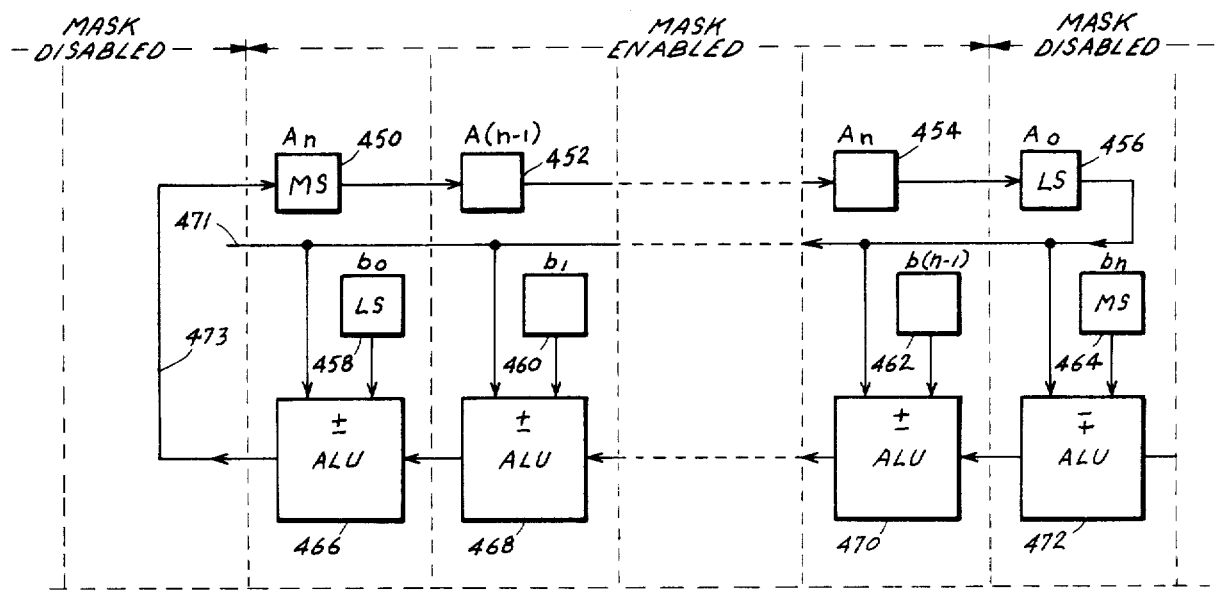
FIG. 8 is a variation of the circuit of FIG. 7 having additional computational capability.

Referring now to FIG. 8, a modified associative cell from the cell described with reference to FIG. 7 is shown which achieves the above noted features. The cell structure is such that the coefficients $a_n, a_{n-1} \ldots A_o$ of the number $A_n \ldots A_{(n-1)} \ldots A_n \ldots A_o$ are held in registers 450, 452, 454 and 456 of as many adjacent cells as are required to hold the number. The coefficients $B_o \ldots B_1 \ldots B_{(n-1)} \ldots B_n$ are held in registers 458, 460, 462 and 464, each of which is coupled to ALU's 466, 468, 470 and 472 respectively. It can be seen that certain processing operations now occur during MASK DISABLED rather than during MASK ENABLED. The significance of this is that the use of the MASK DISABLE function identifies the cell which not only performs the connection between the output of flip-flop 456 to the shift line 471 but also determines that ALU 472 performs a substract function when the MASK ENABLED ALU's 466, 468 and 472 perform an addition (and conversely ALU 472 performs addition when the other ALU's perform subtraction). As in FIG. 7, the MASK DISABLED cell at the other end of the ENABLED section performs the connection of ALU 466 to flip-flop 450 via line 473.

While the circuit of FIG. 8 is an improvement over the circuit of FIG. 7, it has been discovered that further modification is required (1) to insure that the edge cells in the MASK DISABLED area are compatable, and (2) that the carry bit from an add operation is compatable with a following subtract operation in the arithmetic logic unit. Before addressing the solution to the foregoing problems, the problems will be described in greater detail.

Figure 9:
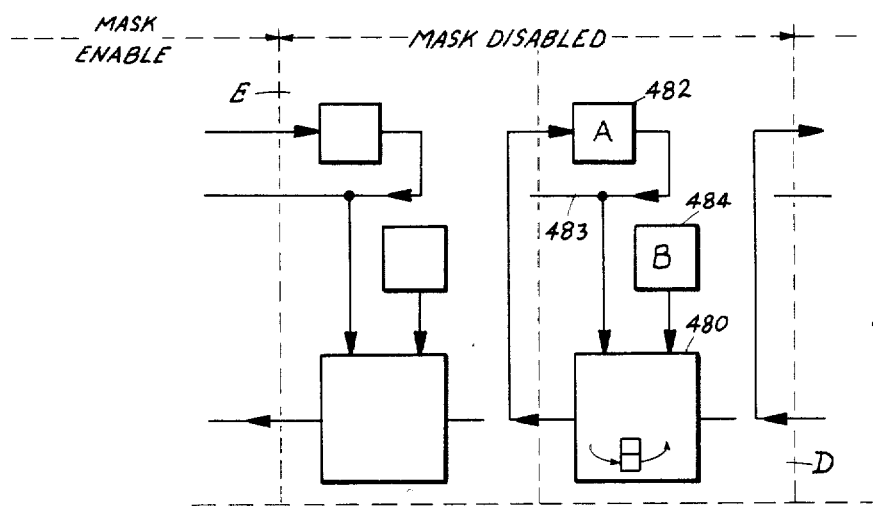
FIG. 9 is a block diagram further illustrative of the operation of an associative cell.

FIG. 9 illustrates the nature of the problem of compatibility of the edge cells. The problem is not caused by the actual connection of cells at the "edges", or the MASK DISABLED cells on either side of an enabled section, but rather is caused in a cell in the middle of the MASK DISABLED area, illustrated by cell D in FIG. 9.

Cell D of FIG. 9 performs both the operations of the MASK DISABLED edge cells described above simultaneously (flip-flops A & B contain values left from previous calculations). The output of flip-flop 482 is connected to line 483 in the same manner that flip-flop 456 of FIG. 8 is connected to the multiplier shift line 471, and the carry output of ALU 480 is connected to the input of flip-flop A by the neighboring MASK DISABLED cell E. In addition, ALU 480 will be performing additions or subtractions in a manner similar to that of the ALU 472 of FIG. 9.

The consequence of the foregoing is that the values in flip-flops A and B will be modified as a result of a sequence of shift pulses applied to all the cells in the row during the multiplications taking place in the MASK ENABLED portion. This is not acceptable because the values should remain unchanged because they will be needed in subsequent operations. The detailed description of how these bits would be changed is given below.

The truth table shown below illustrates the logical states for the implementation of the subtraction function in the ALU 480 of cell D of FIG. 9 where:

A is a number held in register 482

B is a number held in register 484 which functions as a multiplicand

Ci is the carry bit in

Co is the carry bit out

Ri is the result in from the previous step

Ro is the result out

State is the state of the cell D in terms of the values of A, B, and Ci

TRUTH TABLE

| Ri | A | B | Ci | State | Ro | Co |
|----|---|---|----|----|----|----|
| 0 | 0 | 0 | 0 | 0 | 0 | 0 |
| 0 | 0 | 0 | 1 | 1 | 1 | 1 |
| 0 | 0 | 1 | 0 | 2 | 0 | 0 |
| 0 | 0 | 1 | 1 | 3 | 1 | 1 |
| 0 | 1 | 0 | 0 | 4 | 0 | 0 |
| 0 | 1 | 0 | 1 | 5 | 1 | 1 |
| 0 | 1 | 1 | 0 | 6 | 0 | 1 |
| 0 | 1 | 1 | 1 | 7 | 1 | 1 |

States 0, 2, 5 and 7 are stable, but state 6 goes to state 1 which in turn goes to state 3 which in turn goes to state 7, and state 4 goes to state 0. From the foregoing, it has been discovered that every MASK DISABLED cell must be disabled except for the cell c, which is the exteme left hand end of the MASK DISABLED area illustrated by cell C of FIG. 10. It should be noted that cell C of FIG. 10 contains the moist significant bit of the multiplicand, and will be refered to as such in the remainder of the disclosure and claims. The difference, or manner of identification of the cell, can be accomplished by applying an input data bit to this particular cell, or by having a second internal identification bit which may be set by a previous instruction.

Figure 10:
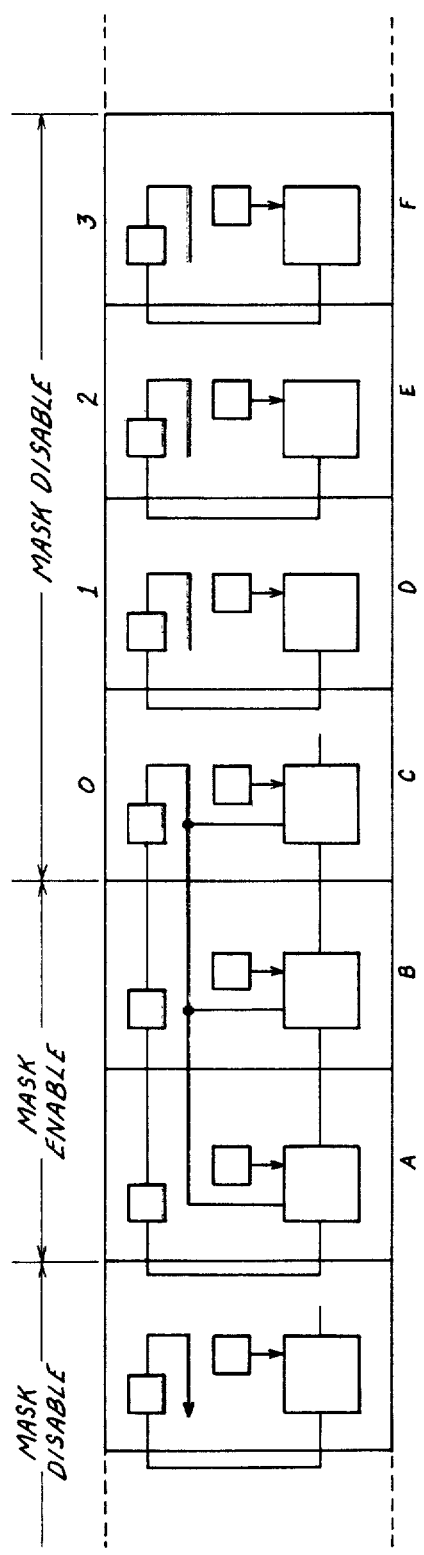
FIG. 10 illustrates a row of associative cells performing a multiplication in accordance with applicant's invention.

FIG. 10 illustrates a row of associative cells performing a 3-bit multiplication in cells A, B and C. Each cell is identical to the cells described with reference to FIG. 9, and hence reference is directed to FIG. 9 for a description of the operation thereof. Cells D, E and F are identical to the cell described with reference to FIG. 9, and each contains flip-flops and ALU's as previously described with reference to FIG. 9.

The second problem mentioned above, i.e. that of the compatability of the carry from an add operation with a subsequent subtract in the ALU will now be addressed. This problem, which can also be described as having an alternating add and subtract in what is in effect a "carry save" adder, can be solved by modifying the ALU circuitry to have separate carry and borrow save paths which may be active either simultaneously or alternately.

Figure 11:
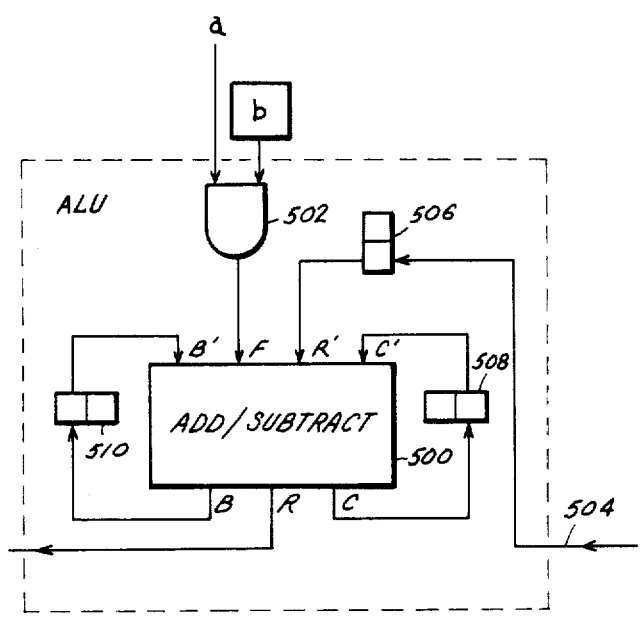
FIG. 11 is a block and logic diagram of the arithmetic logic unit of an associative; cell, illustrative of the operation of applicant's invention.

Referring now to FIG. 11, an ALU circuit capable of solving the foregoing identified problems is illustrated.

An add/subtract circuit 500, which may be comprised of combinational logic circuitry of well-known design, to be described in the truth table below has coupled to it numbers a and b, which may be a multiplier and multiplicand, or other numbers to be operated upon. Numbers a and b are coupled to add/subtract circuit 500 via AND gate 502 and input F. The result R' from the previous cell stage and the previous shift time is coupled on line 504 to a delay flip-flop 506 and then to add/subtract circuit 500 at the R' input. The carry C' from the previous shift time is obtained from delay flip-flop 508, which receives the carry C from the C output of circuit 500, delays it for one shift time, and applies it to the C' input of circuit 500. Similarly, the borrow B output of circuit 500 is applied to delay flip-flop 510, delayed for one shift time, and applied to the B' input of circuit 500 as the borrow from the previous shift time. The fast in data from AND gate 502 is applied to circuit 500 at the F input. The computation result R is coupled from the R output of circuit 500 to the next cell, and becomes the R' input for the next cell.

The truth tables for the addition and subtraction functions of the arithmetic logic unit 500 of FIG. 11 are shown below, where:

F is an incoming binary number
R' is the result from the previous stage and previous shift time
C' is the carry from the previous shift time
B' is the borrow from the previous shift time
R is the current computed result
C is the current carry
B is the current borrow For the addition function $R = F + R' + C' - B'$, the truth table is:

| F | R' | C' | B' | R | C | B |
|---|----|----|----|---|---|---|
| 0 | 0 | 0 | 0 | 0 | 0 | 0 |
| 0 | 0 | 0 | 1 | 1 | 0 | 1 |
| 0 | 0 | 1 | 0 | 1 | 0 | 0 |
| 0 | 0 | 1 | 1 | 0 | 0 | 0 |
| 0 | 1 | 0 | 0 | 1 | 0 | 0 |
| 0 | 1 | 0 | 1 | 0 | 1 | 1 |
| 0 | 1 | 1 | 0 | 0 | 1 | 0 |
| 0 | 1 | 1 | 1 | 1 | 0 | 0 |
| 1 | 0 | 0 | 0 | 1 | 0 | 0 |
| 1 | 0 | 0 | 1 | 0 | 1 | 1 |
| 1 | 0 | 1 | 0 | 0 | 1 | 0 |
| 1 | 0 | 1 | 1 | 1 | 0 | 0 |
| 1 | 1 | 0 | 0 | 0 | 1 | 0 |
| 1 | 1 | 0 | 1 | 1 | 1 | 1 |
| 1 | 1 | 1 | 0 | 1 | 1 | 0 |
| 1 | 1 | 1 | 1 | 0 | 1 | 0 |

For the subtraction function $R = F - R' + C' - B'$, the truth table is:

| F | R' | C' | B' | R | C | B |
|---|----|----|----|---|---|---|
| 0 | 0 | 0 | 0 | 0 | 0 | 0 |
| 0 | 0 | 0 | 1 | 1 | 0 | 1 |
| 0 | 0 | 1 | 0 | 1 | 0 | 0 |
| 0 | 0 | 1 | 1 | 0 | 0 | 0 |
| 0 | 1 | 0 | 0 | 1 | 0 | 1 |
| 0 | 1 | 0 | 1 | 0 | 0 | 1 |
| 0 | 1 | 1 | 0 | 0 | 0 | 0 |
| 0 | 1 | 1 | 1 | 1 | 0 | 1 |
| 1 | 0 | 0 | 0 | 1 | 0 | 0 |
| 1 | 0 | 0 | 1 | 0 | 1 | 1 |
| 1 | 0 | 1 | 0 | 0 | 1 | 0 |
| 1 | 0 | 1 | 1 | 1 | 0 | 0 |
| 1 | 1 | 0 | 0 | 0 | 0 | 0 |
| 1 | 1 | 0 | 1 | 1 | 0 | 1 |
| 1 | 1 | 1 | 0 | 1 | 0 | 0 |
| 1 | 1 | 1 | 1 | 0 | 0 | 0 |

While the present invention has been described in connection with a preferred embodiment thereof, it is to be understood that additional embodiments, modifications and applications which will become obvious to those skilled in the art are included within the spirit and scope of the invention as set forth by the claims appended thereto.

What is claimed is:

1. An associative processor comprising:
an array of rows and columns of associative cells, each of said cells being adapted to simultaneously store a sum bit and a carry bit, and each of said cells including:
  masking means for identifying that one or more particular cells contains either a multiplier or a multiplicand bit or any combination thereof;
  means for storing a multiplicand bit;
  means for multiplying the multiplicand bit with a multiplier bit;

means for enabling said cell during a multiplication operation such that said cell stores two bits of the multiplication result;

arithmetic logic unit means for serially receiving multiplier bits for adding or subtracting said masked multiplicand bit to the results of the arithmetic operation from the previous shift time to derive a current multiplication result; and means for coupling said current multiplication result to the adjacent associative cell in the same shift time in which the current result is obtained, such that multiplication occurs simultaneously in adjacent cells for a multiplicand of arbitrary digit length and a multiplier of fixed or variable length.

2. An associative processor in accordance with claim 1 further including: control means for receiving multi-bit instruction words to be executed by said processor and for controlling the execution of said instructions by said processor, said control means including means for coupling multi-bit instruction words to said masking means for enabling and disabling portions of said processor, and to said processor for storage therein.

3. An associative processor in accordance with claim 1, wherein said multiplicand and multiplier bits are representative of digital signal information, such that said signals are multiplied by said processor in real time.

4. An associative processor in accordance with claim 1, wherein the data in said data field is configured as binary two's complement numbers.

5. An associative processor in accordance with claim 4, wherein said binary two's complement numbers are operated upon in each cell of said array under the control of said mask means.

6. An associative processor in accordance with claim 1, wherein for each cell of said array, said means for coupling said current multiplication result to the adjacent associative cell includes means for providing a loop back connection between the inputs and outputs of the cells when the cell is disabled during a multiplication operation, whereby serial multiplication is obtained irrespective of the location of said cell in the associative array.

7. An associative processor in accordance with claim 4, wherein the multiplier and multiplicand are numbers represented by:

$$P = a_n 2^n + a_{(n-1)} 2^{(n-1)} + a_{(n-2)} 2^{(n-2)} \ldots$$
$$a_o 2^o = -a_n 2^n + A \text{ and}$$

$$Q = b_n 2^n + b_{(n-1)} 2^{(n-1)} + b_{(n-2)} 2^{(n-2)} \ldots$$
$$b_o 2^o = -b_n 2^n + B$$

and wherein the binary significance of B is determined by position in the array and the binary significance of A is determined by the time when its coefficient is shifted within said array.

8. An associative processor in accordance with claim 6, further comprising:

means for disabling of the cell containing the most significant bit of the multiplicand in the mask disabled area when cells are disabled by said masking means during said multiplication operation.

9. An associative processor in accordance with claim 8, further comprising:

means for identifying the cell containing the most significant bit of the multiplicand in the mask disabled area of the row.

10. An associative processor in accordance with claim 9, wherein said means for identifying said cell includes means for applying an input data bit to said cell.

11. An associative processor in accordance with claim 9, wherein said means for identifying said cell includes an internal flip-flop within said cell and means for setting and unsetting said flip-flop.

12. An associative processor in accordance with claim 1, wherein said arithmetic logic unit means for each cell in said array means includes:

means for providing separate carry and borrow save paths for coupling bits either simultaneously or alternately, such that the carry from an add operation is compatible with a subsequent subtraction operation, and the borrow from a subtract operation is compatible with a subsequent addition operation.

13. An associative processor in accordance with claim 12, wherein said arithmetic logic unit means for each cell in said array includes:

means for coupling incoming binary numbers F to an add/subtract circuit;

means for coupling the result R' from the previous cell stage and previous shift time, to said add/subtract circuit;

means for coupling the carry C' from the previous shift time to said add/subtract circuit after a one shift time delay;

means for delaying the borrow B of said add/subtract circuit means one shift time and coupling said delayed borrow B' from the previous shift time; and means for obtaining the computational result R upon said incoming binary numbers F from said add-/subtract circuit means and coupling said result R to the next adjacent cell as the R' input thereof.

14. An associative processor in accordance with claim 1, wherein said means for storing a multiplicand bit comprises a flip-flop.

15. An associative processor in accordance with claim 1, wherein said means for storing a multiplier bit comprises a shift register.

16. An associative processor in accordance with claim 1, wherein said means for masking the multiplicand bits includes a mask cell associated with each array row or column and, in each array cell, means for AND'-ing said multiplicand bits with said multiplier bits to obtain a fast multiplication input to said array cell.

17. A method of fast multiplication of variable length binary numbers in an associative processing array of associative processing cells comprising the steps of:

storing a plurality of binary instructions, each instruction including an operation field, a data field and a masking field;

enabling and disabling individual of said processing cells in accordance with said masking field to implement a fast multiplication operation in arithmetic logic units of each cell on serial multipliers coupled to said cells under the control of said operation field;

multiplying the multiplicands with multiplier bits to obtain a fast multiplication input to the arithmetic logic units of the cells;

coupling said multiplicands in parallel and said multiplier bits serially to an arithmetic logic unit in each of said associative array cells to derive multiplication product result; and coupling said multiplication product result in each cell to the adjacent cell in the same shift time such that multiplication is performed simultaneously in each cell for multiplicands and multipliers of arbitrary digit length.

18. A method in accordance with claim 17, further including the substep within the masking step of:

preventing the disabling during the multiplication process by the masking means of the cell containing the most significant bit of the multiplicand in the disabled cells.

19. A method in accordance with claim 18, further including the substep within the masking step of identifying said cell of the mask disabled area of the row.

20. A method in accordance with claim 17, further including a substep of the final step of:

coupling separate carry and borrow save paths for coupling bits either simultaneously or alternately such that the carry from an add operation is compatible with a subsequent subtract operation, and a borrow from a subtract operation is compatible with a subsequent addition operation.

21. A method in accordance with claim 17, wherein said binary instructions are two's complement data.

* * * * *